(12) United States Patent
Lee

(10) Patent No.: US 12,314,167 B2
(45) Date of Patent: May 27, 2025

(54) STORAGE DEVICE, HOST DEVICE, AND ELECTRONIC DEVICE TO MANAGE DATA CORRESPONDING TO CHANGED MAPPING INFORMATION

(71) Applicant: SK hynix Inc., Icheon-si (KR)

(72) Inventor: Do Hyeong Lee, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/118,447

(22) Filed: Mar. 7, 2023

(65) Prior Publication Data
US 2024/0095181 A1   Mar. 21, 2024

(30) Foreign Application Priority Data
Sep. 19, 2022   (KR) .......................... 10-2022-0117640

(51) Int. Cl.
*G06F 12/02*   (2006.01)
(52) U.S. Cl.
CPC .. *G06F 12/0246* (2013.01); *G06F 2212/7201* (2013.01)
(58) Field of Classification Search
CPC ......... G06F 12/0246; G06F 2212/0246; G06F 2212/7201
See application file for complete search history.

(56) References Cited

U.S. PATENT DOCUMENTS

| | | | | |
|---|---|---|---|---|
| 10,838,853 B1* | 11/2020 | Kuzmin | ............... | G06F 12/0246 |
| 2017/0192902 A1* | 7/2017 | Hwang | ................. | G06F 3/0661 |
| 2019/0121540 A1* | 4/2019 | Shin | ...................... | G06F 13/126 |
| 2021/0064287 A1* | 3/2021 | Kanno | ................. | G06F 3/0616 |
| 2021/0278993 A1* | 9/2021 | You | ......................... | G06F 3/0655 |
| 2022/0358016 A1* | 11/2022 | Park | .................... | G06F 11/1415 |
| 2023/0342037 A1* | 10/2023 | Sahin | .................... | G06F 3/0659 |

FOREIGN PATENT DOCUMENTS

KR   20200116704 A   10/2020
KR   20210016184 A   2/2021

* cited by examiner

*Primary Examiner* — Chie Yew
(74) *Attorney, Agent, or Firm* — Perkins Coie LLP

(57) ABSTRACT

An electronic device may include a storage device including a memory device configured to store data which includes map data including a plurality of map segments and a memory controller configured to be in communication with the memory device; and a host device configured to be in communication with the storage device and structured to include a host memory and configured to transmit, to the storage device, a request for one or more of the plurality of map segments from the storage device, wherein the memory controller of the storage device is configured to provide the one or more map segments to the host memory in the host device in response to the request from the host device, and wherein the host device is configured to transmit, to the storage device, a command requesting access to the memory device based on the one or more map segments.

18 Claims, 14 Drawing Sheets

STORAGE DEVICE, HOST DEVICE, AND ELECTRONIC DEVICE TO MANAGE DATA CORRESPONDING TO CHANGED MAPPING INFORMATION

CROSS-REFERENCE TO RELATED APPLICATION

This patent document claims the priority and benefits of the Korean patent application number 10-2022-0117640, filed on Sep. 19, 2022, which is incorporated herein by reference in its entirety.

TECHNICAL FIELD

Various embodiments of the disclosed technology relate to a data storage device, a host device, and an electronic device.

BACKGROUND

A data storage device is coupled to or in communication with a host device to perform a data input/output operation in response to a request from the host device. The storage device may use various types of data storage media to store data. Examples of the storage media may include a nonvolatile memory device, such as a flash memory device.

The flash memory device is unique because data cannot be overwritten and can only be written to an empty or erased memory cell. In some cases, the minimum unit for program (write) and read operations is different from the minimum unit for erase operations. In the case of NAND flash, data can be written or read on a page basis and can be erased on a block basis. A physical address is used to identify the location of a memory cell, and a logical address is used to access the physical address. Therefore, a read/write request from the host device is provided together with a logical address, and the logical address provided from the host device is mapped to a physical address.

Mapping information between logical addresses and physical addresses may be stored in a nonvolatile memory device, and may be loaded into a buffer memory.

SUMMARY

Various embodiments of the disclosed technology relate to a storage device, a host device, and an electronic device that can improve operating characteristics.

In some embodiments of the disclosed technology, an electronic device may include a storage device including a memory device configured to store data which includes map data including a plurality of map segments and a memory controller configured to be in communication with the memory device and operable to control the memory device; and a host device configured to be in communication with the storage device and structured to include a host memory and configured to transmit, to the storage device, a request for one or more of the plurality of map segments from the storage device, wherein the memory controller of the storage device is configured to provide the one or more map segments to the host memory in the host device in response to the request from the host device, and wherein the host device is configured to transmit, to the storage device, a command requesting access to the memory device based on the one or more map segments.

In some embodiments of the disclosed technology, a storage device may include a memory device configured to store data which includes map data including a plurality of map segments; and a memory controller configured to be in communication with the memory device and, upon receipt of a request from a host device, provide, to the host device, one or more of the plurality of map segments designated by the host device.

In some embodiments of the disclosed technology, a host device may include a host controller configured to transmit, to a storage device outside the host device, a request for one or more of a plurality of map segments stored in a memory device of the storage device; and a host memory configured to be in communication with the host controller and to cache the one or more map segments received from the storage device.

In some embodiments of the disclosed technology, an electronic device may include a storage device including a memory device configured to store map data including a plurality of map segments and a memory controller configured to control the memory device, and a host device including a host memory and configured to request one or more of the plurality of map segments from the storage device, wherein the memory controller provides the one or more map segments to the host memory in response to the request, and wherein the host device provides a command requesting access to the memory device to the storage device based on the one or more map segments.

In some embodiments of the disclosed technology, a storage device may include a memory device configured to store map data including a plurality of map segments, and a memory controller configured to provide one or more of the plurality of map segments designated by an external host device to the host device in response to a request received from the host device.

In some embodiments of the disclosed technology, a host device may include may include a host controller configured to request one or more of a plurality of map segments stored in a memory device of an external storage device from the storage device, and a host memory configured to cache the one or more map segments received from the storage device.

DETAILED DESCRIPTION

Specific structural features or functions for certain embodiments of the disclosed in this patent document are examples only to illustrate certain implementations of the disclosed technology.

Figure 1:
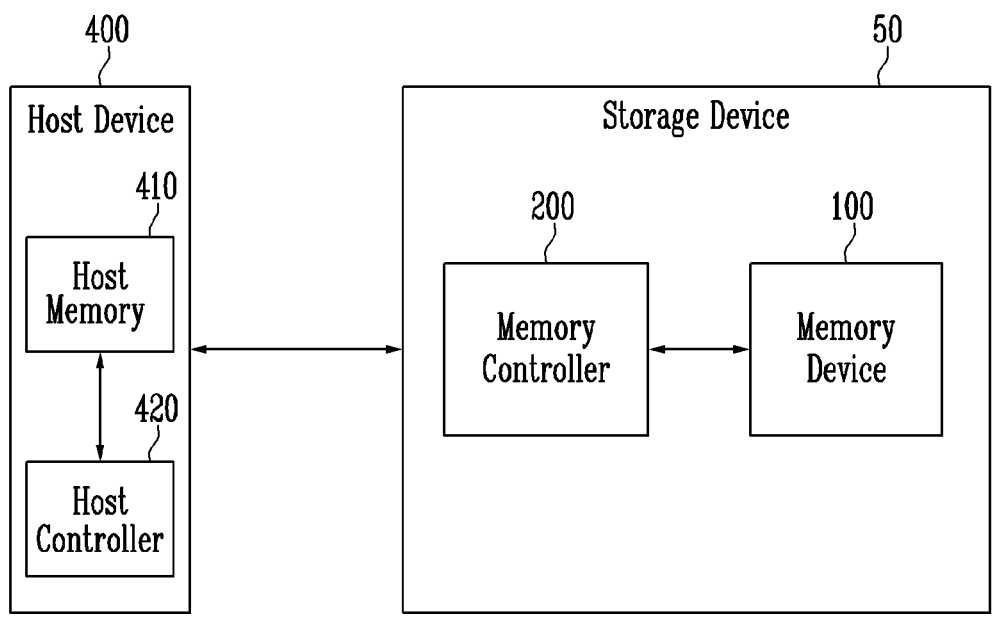
FIG. 1 is a diagram illustrating an electronic device based on some embodiments of the disclosed technology.

FIG. 1 is a diagram illustrating an electronic device based on some embodiments of the disclosed technology.

Referring to FIG. 1, an electronic device or system 1000 may include a storage device 50 and a host device 400 that are in communication with each other.

The storage device 50 may include a memory device 100 and a memory controller 200. In some implementations of the electronic device 1000, the storage device 50 may be a device which stores data under the control of a host device 400 which may be a hand-held device, a portable device, a device for use in homes and offices, or others, such as a mobile phone, a smartphone, an MP3 player, a laptop computer, a desktop computer, a game console, a TV, a tablet PC, or an in-vehicle infotainment system. Alternatively, in other larger scale implementations of the electronic device or system 1000, the storage device 50 may be a device which stores large-capacity data in one place, such as a server or a data center, under the control of the host device 400.

The storage device 50 may be manufactured as any one of various types of storage devices depending on a host interface which is a scheme for communication with the host device 400. For example, the storage device 50 may be implemented as any one of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a non-volatile memory express (NVMe) storage device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in any one of various types of package forms. For example, the storage device 50 may be manufactured in any one of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 may be operated under the control of the memory controller 200. The memory device 100 may include a memory cell array including a plurality of memory cells which store data.

Each of the memory cells may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits. The memory cell array may include a plurality of memory blocks.

Each memory block may include a plurality of memory cells. Each memory block may include a plurality of pages. In an embodiment, a page may be the minimum unit for read or write (program) operations on the memory device 100. A memory block may be the minimum unit for erase operations.

In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory, a resistive RAM (RRAM), a phase-change RAM (PRAM), a magnetoresistive RAM (MRAM), a ferroelectric RAM (FRAM), or a spin transfer torque RAM (STT-RAM). For convenience of description, in the present specification, a description is made on the assumption that the memory device 100 is a NAND flash memory.

The memory device 100 may receive a command and an address from the memory controller 200, and may access the area of the memory cell array, selected by the address. The memory device 100 may perform an operation indicated by the command on the area selected by the address. For example, the memory device 100 may perform a write operation (i.e., a program operation), a read operation, and an erase operation. During a program operation, the memory device 100 may program data to the area selected by the address. During a read operation, the memory device 100 may read data from the area selected by the address. During an erase operation, the memory device 100 may erase data stored in the area selected by the address.

The memory controller 200 may control the overall operation of the storage device 50.

When power is applied to the storage device 50, the memory controller 200 may run firmware (FW). When the memory device 100 is a flash memory device, the memory controller 200 may run firmware such as a flash translation layer (FTL) for controlling communication between the host device 400 and the memory device 100.

In an embodiment, the memory controller 200 may receive a logical address (LA) from the host device 400, and may translate the logical address into a physical address (PA) indicating the address of memory cells which are included in the memory device 100 and in which data is to be stored or from which data is to be read. Alternatively, in an embodiment, the memory controller 200 may receive a physical address from the host device 400, and may store data in the memory device 100 or read data from the memory device 100 based on the physical address received from the host device 400 without address translation. In some implementations, the term "map data" can be used to indicate mapping information between logical addresses and physical addresses and may be stored in the memory cell array included in the memory device 100. In some implementations, the memory controller 200 may directly cache and use the map data in a buffer memory in the memory controller 200 or may load map data into the host device 400 if necessary. In some implementations, the physical address may indicate a physical address in the memory device 100. In some implementations, the physical address may indicate a virtual address (VA) that is primarily translated before a logical address is translated into a physical address.

The memory controller 200 may control the memory device 100 so that a program operation, a read operation or an erase operation is performed in response to a request received from the host device 400. During a program operation, the memory controller 200 may provide a program command, a physical address, and data to the memory device 100. During a read operation, the memory controller 200 may provide a read command and a physical address to the memory device 100. During an erase operation, the memory controller 200 may provide an erase command and a physical address to the memory device 100.

In an embodiment, the memory controller 200 may internally generate a command, an address, and data regardless of whether a request from the host device 400 is received, and may transmit them to the memory device 100. For example, the memory controller 200 may provide the memory device 100 with commands, addresses, and data required in order to perform a program operation, a read operation, and erase operations that are involved in performing wear leveling, read reclaim, garbage collection, etc.

In an embodiment, the memory controller 200 may control two or more memory devices 100. In this case, the memory controller 200 may control the memory devices 100 depending on an interleaving scheme to improve operating performance. The interleaving scheme may be a scheme for controlling the memory devices 100 so that the operations of at least two memory devices 100 are caused to overlap each other.

The host device 400 may include a host memory 410 and a host controller 420.

The host device 400 may communicate with the storage device 50 using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

The host memory 410 may temporarily store the command, data, etc. to be transmitted from the host controller 420 to the storage device 50. Further, the host memory 410 may temporarily store a response received from the storage device 50. The host memory 410 may be, but is not limited to, a random access memory such as a dynamic random access memory (DRAM) or a static random access memory (SRAM). In an example, the host memory 410 may include a volatile memory such as a static RAM (SRAM), a dynamic RAM (DRAM), or a synchronous DRAM (SDRAM), or various nonvolatile memories such as a phase-change RAM (PRAM), a magneto-resistive RAM (MRAM), a resistive RAM (ReRAM), or a ferro-electric RAM (FRAM). The host memory 410 may be accessed not only by the host controller 420 but also by the memory controller 200 of the storage device 50. A partial area of the host memory 410 may be a host buffer memory area that is usable as a buffer memory by the memory controller 200. The host memory 410 may store map data provided from the memory device 100.

The host controller 420 may control the overall operation of the host device 400. Although not illustrated in FIG. 1, the host controller 420 may include one or more central processing units (CPUs).

The host controller 420 may generate a command to be provided to the storage device 50, may directly provide the generated command to the storage device 50, or may store the generated command in the host memory 410 and thereafter request the storage device 50 to receive the generated command.

The disclosed technology can be implemented in some embodiments to allow a host to directly send a request for map data to be loaded into a cache or buffer memory without going through an additional process that otherwise would have been performed by a memory controller. In some implementations, the host controller 420 may send a request to the storage device 50 for map data. In one example, the host controller 420 may send a request to the storage device 50 for specific map data. Furthermore, the host controller 420 may provide a command, together with an address corresponding thereto, to the storage device 50. The host controller 420 may translate a logical address corresponding to the command generated into a physical address based on the map stored in the host memory 410 and provide the physical address to the storage device 50, or may provide the logical address corresponding to the generated command to the storage device 50 without translating the logical address into a physical address.

Figure 2:
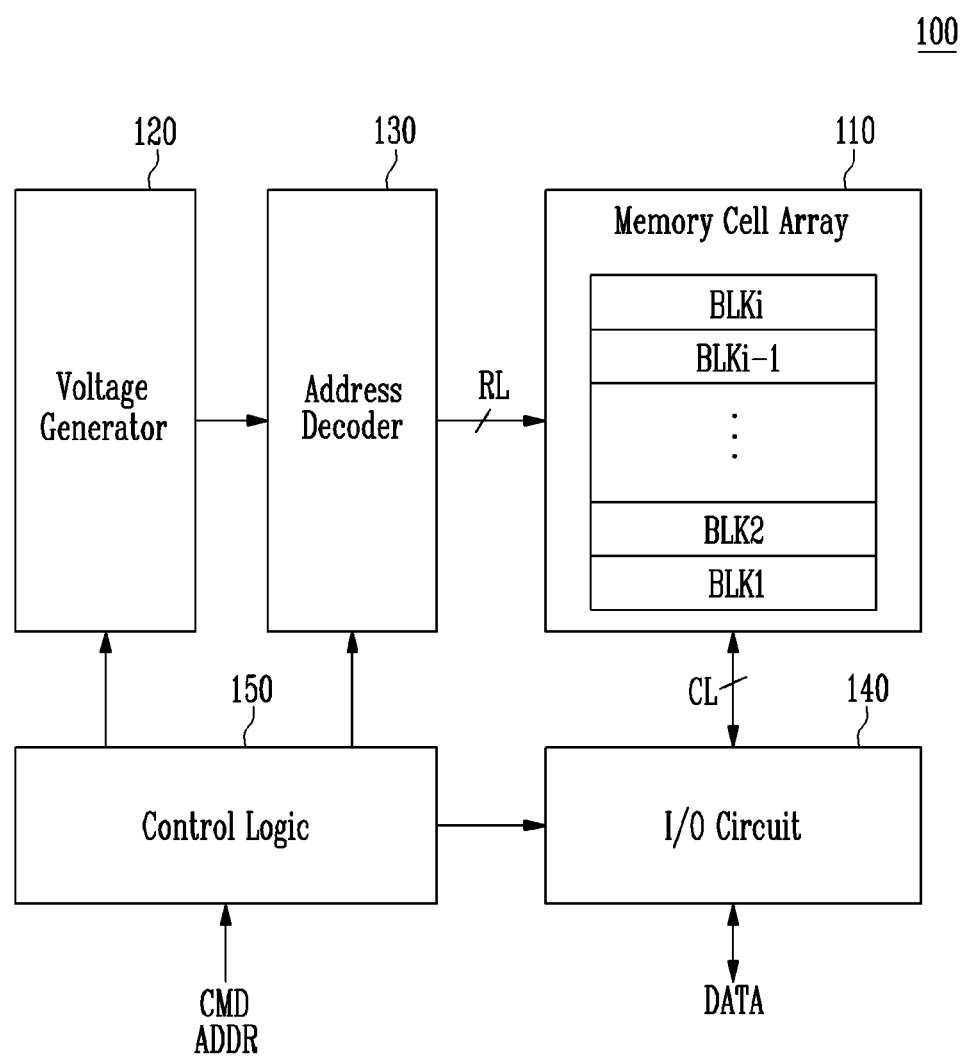
FIG. 2 is a diagram illustrating a memory device of FIG. 1.

FIG. 2 is a diagram illustrating the memory device of FIG. 1.

Referring to FIG. 2, a memory device 100 may include a memory cell array 110, a voltage generator 120, an address decoder 130, an input/output (I/O) circuit 140, and a control logic 150.

The memory cell array 110 includes a plurality of memory blocks BLK1 to BLKi. The plurality of memory blocks BLK1 to BLKi may be coupled to the address decoder 130 through row lines RL. The plurality of memory blocks BLK1 to BLKi may be coupled to the input/output (I/O) circuit 140 through column lines CL. In an embodiment, the row lines RL may include word lines, source select lines, and drain select lines. In an embodiment, the column lines CL may include bit lines.

Each of the memory blocks BLK1 to BLKi includes a plurality of memory cells. In an embodiment, the plurality of memory cells may be nonvolatile memory cells. Memory cells coupled to the same word line, among the plurality of memory cells, may be defined as one physical page. That is, the memory cell array 110 may include a plurality of physical pages. Each of the memory cells of the memory device 100 may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

In an embodiment, at least part of the memory cell array 110 may be used to store map data.

In an embodiment, the voltage generator 120, the address decoder 130, and the I/O circuit 140 may be collectively designated as a peripheral circuit. The peripheral circuit may be used to perform operations associated with the memory cell array 110 under the control of the control logic 150. In some implementations, the peripheral circuit may perform a program operation, a read operation, and/or an erase operation on the memory cell array 110.

The voltage generator 120 may generate a plurality of operating voltages using an external supply voltage provided to the memory device 100. The voltage generator 120 may be operated under the control of the control logic 150.

In an embodiment, the voltage generator 120 may generate an internal supply voltage by regulating the external supply voltage. The internal supply voltage generated by the voltage generator 120 may be used as an operating voltage for the memory device 100.

In an embodiment, the voltage generator 120 may generate the plurality of operating voltages using the external supply voltage or the internal supply voltage. The voltage generator 120 may generate various voltages required by the memory device 100. For example, the voltage generator 120 may generate a plurality of erase voltages, a plurality of program voltages, a plurality of pass voltages, a plurality of select read voltages, and a plurality of unselect read voltages.

The voltage generator 120 may include a plurality of pump capacitors to raise or lower the internal supply voltage and generate a plurality of operating voltages having various voltage levels, and may generate the plurality of operating voltages by selectively enabling the plurality of pumping capacitors under the control of the control logic 150.

The generated operating voltages may be supplied to the memory cell array 110 by the address decoder 130.

The address decoder 130 is coupled to the memory cell array 110 through the row lines RL. The address decoder 130 may be operated under the control of the control logic 150. The address decoder 130 may receive addresses ADDR from the control logic 150. The address decoder 130 may decode the received addresses ADDR to obtain a block address from the received addresses ADDR. The address decoder 130 may select at least one of the memory blocks BLK1 to BLKi according to the block address. The address decoder 130 may decode the received addresses ADDR to obtain a row address from the received addresses ADDR. The address decoder 130 may select at least one of word lines of the selected memory block according to the row address. In an embodiment, the address decoder 130 may decode the received addresses ADDR to obtain a column address from the received addresses ADDR. The address decoder 130 may couple the I/O circuit 140 to the memory cell array 110 according to the column address.

In an embodiment, the address decoder 130 may include components such as a row decoder, a column decoder, and an address buffer.

The I/O circuit 140 may include a plurality of page buffers. The plurality of page buffers may be coupled to the memory cell array 110 through the bit lines. During a program operation, data may be stored in selected memory cells based on the data stored in the plurality of page buffers.

During a read operation, the data stored in the selected memory cells may be "sensed" or read out through bit lines, and the sensed data may be stored in the page buffers.

The control logic 150 may control the address decoder 130, the voltage generator 120, and the I/O circuit 140. The control logic 150 may be operated in response to a command CMD transferred from an external device. The control circuit 150 may control the peripheral circuit by generating control signals in response to the command CMD and the addresses ADDR.

Figure 3:
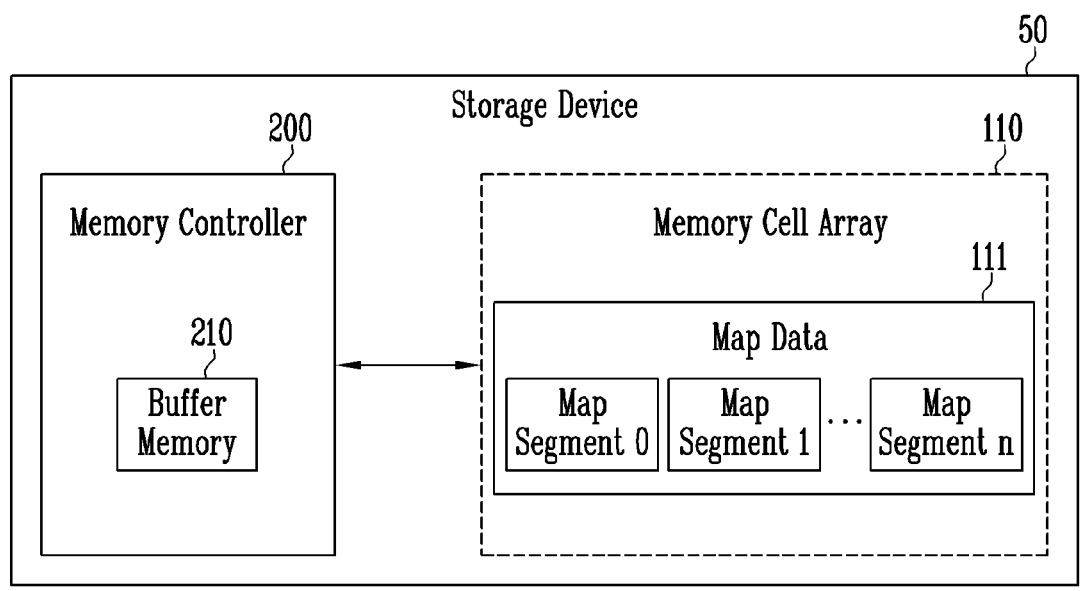
FIG. 3 is a diagram illustrating a storage device based on some embodiments of the disclosed technology.

FIG. 3 is a diagram illustrating a storage device based on some embodiments of the disclosed technology.

Referring to FIGS. 1 to 3, map data 111 may be stored in the memory cell array 110 in the memory device 100 of the storage device 50. The map data 111 may include a plurality of map segments (Map Segment 0 to Map Segment n).

In some implementations, the memory controller 200 in the storage device 50 may include a buffer memory 210. In one example, the memory controller 200 may cache at least part of the map data 111, which is stored in the memory cell array 110, in the buffer memory 210, and may use the cached data. In some implementations, one or more of the plurality of map segments included in the map data 111 may be loaded into the buffer memory 210, and a logical address received from the host device 400 may be translated into a physical address, or alternatively, a physical address to be provided to the host device 400 may be translated into a logical address, based on the loaded map segments.

When part of the information included in the map data 111 is updated, the memory controller 200 may store the updated information. The updated information may be stored in the buffer memory 210 or the memory cell array 110. Further, the memory controller 200 may notify the host device 400 that the part of the map data 111 has been updated.

However, due to the limited space of the buffer memory 210 of the memory controller 200 loaded with map data, an increase in the amount of map data may impose a burden on the operation of the memory controller 200. For example, due to the limited space of the buffer memory 210 that can be allocated for map data by the memory controller 200, part of the map data 111, instead of the entire map data, may be loaded. In the case where a location desired to be accessed by the host device 400 is not included in the partially loaded map data 111, when part of the loaded map data is updated, the memory controller 200 stores the updated map data again in the memory device 100, and reads the map data 111 corresponding to the location desired to be accessed by the host device 400 from the memory device 100. These operations are performed in order for the memory controller 200 to perform a read or write operation required by the host device 400, and the operation performance of the storage device 50 may be deteriorated.

Therefore, as will be described later with reference to FIG. 5, the disclosed technology can be implemented in some embodiments to allow the host memory 410 of the host device 400, which has a relatively large data storage space, may be used as a buffer memory into which map data is to be loaded.

Figure 4:
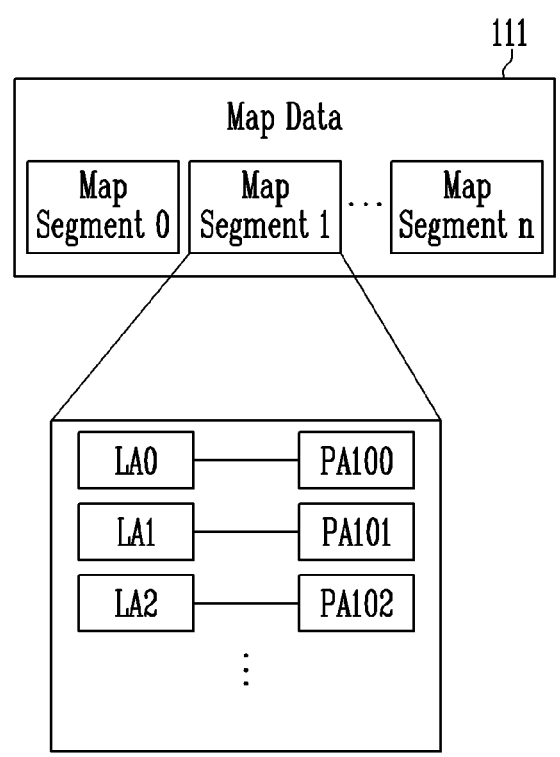
FIG. 4 is a diagram illustrating map data stored in the memory device of FIG. 3.

FIG. 4 is a diagram illustrating map data stored in the memory device of FIG. 3.

Referring to FIGS. 3 and 4, map data 111 stored in the memory cell array 110 may include a plurality of map segments (Map Segment 0 to Map Segment n). Each of the map segments may include mapping information between logical addresses and physical addresses. For example, as illustrated in FIG. 4, pieces of mapping information between logical addresses and physical addresses corresponding to each other, such as logical address LA0-physical address PA100, logical address LA1-physical address PA101, and logical address LA2-physical address PA102, may be stored in the map segment 1.

Figure 5:
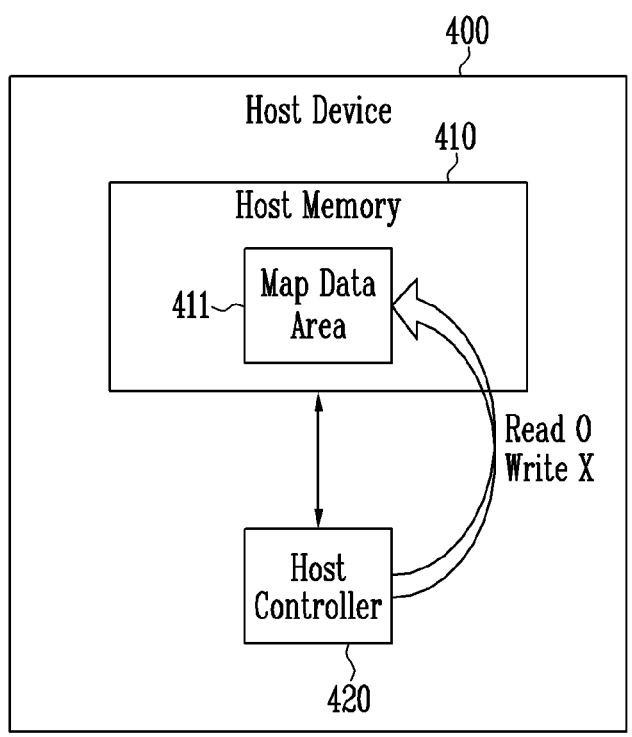
FIG. 5 is a diagram illustrating a host device based on some embodiments of the disclosed technology.

FIG. 5 is a diagram illustrating a host device based on some embodiments of the disclosed technology.

Referring to FIGS. 1, 3, and 5, the host memory 410 in the host device 400 may include a map data area 411. The map data area 411 may be an area into which part of map data 111 stored in the memory device 100 is loaded and stored. In some implementations, the host device 400 may receive one or more of a plurality of map segments included in the map data 111 from the storage device 50, and may cache the received map segments in the map data area 411 of the host memory 400.

The host controller 420 in the host device 400 may generate a command and store the command in the host memory 410, and may send a request to the storage device 50 for required map segments out of the map data 111 stored in the memory device 100. The host controller 420 may request map segments, including mapping information for an address corresponding to data that is expected to be read out frequently, from the storage device 50. The map segments requested by the host controller 420 may not include mapping information for an address corresponding to data that is expected to be written frequently. That is, since the host device 400 performs a read operation, the host device 400 can more accurately predict addresses from which data is read out frequently. Therefore, the host device 400 may directly send a request for mapping information for the address corresponding to data to be read out from the storage device 50 rather than data to be written to the storage device 50.

The host device 400 may read data from the map data area 411 in the host memory 410, but the host device 400 cannot store data in the map data area 411. In the map data area 411, map data 111 may be stored only by the memory controller 200 of the storage device 50. Accordingly, the map data 111 stored in the map data area 411 may be maintained in a form received from the storage device 50, and may not be altered by the host controller 420.

The host device 400 may include the host controller 420 having higher performance and the host memory 410 having larger capacity, compared to the storage device 50 interworking with the host device 400. The host controller 420 and the host memory 410 in the host device 400 have less spatial restriction than the storage device 50, and hardware upgrade of the host controller 420 and the host memory 410 is possible. Therefore, in order to improve the operation efficiency of the storage device 50, resources of the host device 400 may be utilized.

In an embodiment, the data storage space of the host memory 410 included in the host device 400 is greater than that of the buffer memory 210 usable by the memory controller 200. Therefore, the storage device 50 may transfer part of the map data 111 used by the memory controller 200 to the host memory 410 in the host device 400, thus enabling the map data area 411 in the host memory 410 to be used as a cache memory for an address translation process performed by the storage device 50. In this case, the host device 400 may translate a logical address into a physical address based on the mapping information stored in the host memory 410, and may transfer the physical address, which is the target address of a command, together with the command and the logical address, to the storage device 50. Accordingly, the memory controller 200 may skip a process of translating a logical address into a physical address, and may access the memory device 100 based on the received physical address. In this case, the above-described operation burden, occurring when the memory controller 200 uses the buffer memory 210, may be solved, and thus the operation efficiency of the storage device 50 may be greatly improved.

Figure 6:
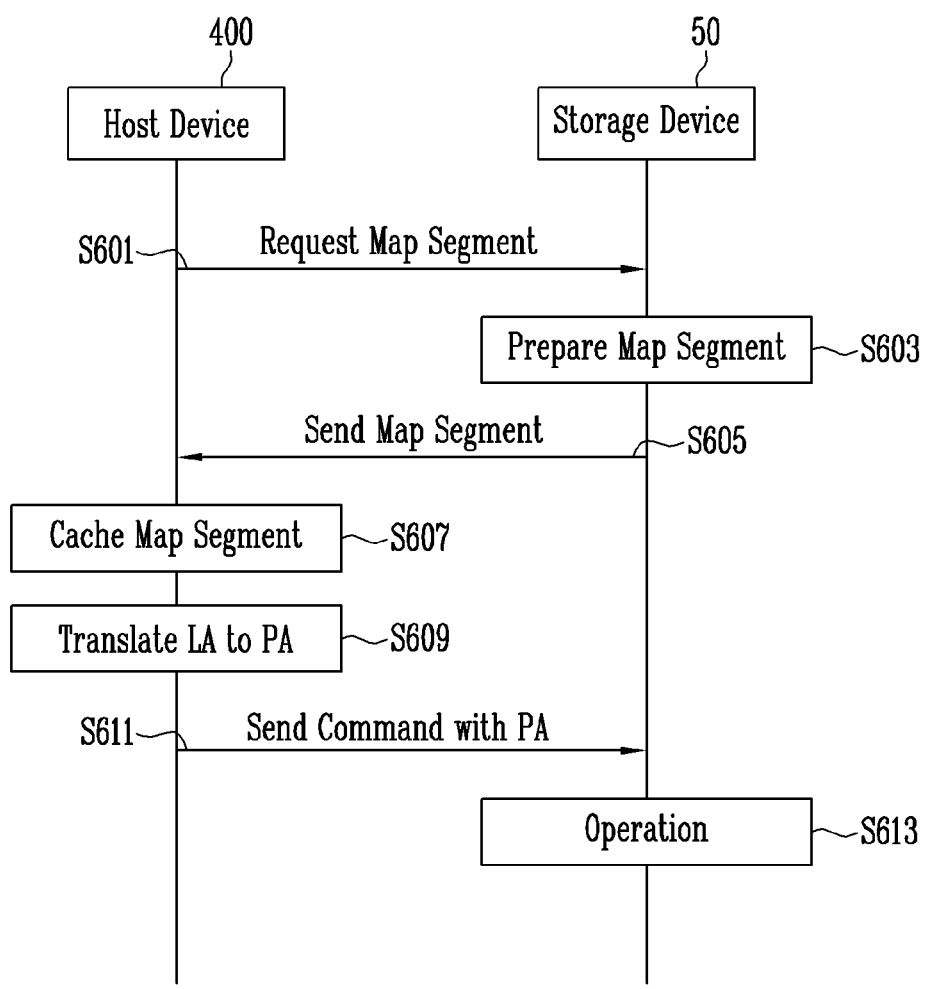
FIG. 6 is a flowchart illustrating an example operation of an electronic device based on some embodiments of the disclosed technology.

FIG. 6 is a flowchart illustrating an example of a process in which an electronic device performs an operation based on some embodiments of the disclosed technology.

Referring to FIG. 6, at S601, a host device 400 may request a map segment from the storage device 50. The host device 400 may designate and request a specific map segment among a plurality of map segments stored in the storage device 50. Accordingly, the storage device 50 may prepare the map segment requested by the host device 400 at S603, and may provide the map segment requested by the host device 400 to the host device 400 at S605.

At S607, the host device 400 may cache the received map segment, and at S609, the host device 400 may translate a logical address corresponding to the command to be provided to the storage device 50 into a physical address based on the cached map segment.

At S611, the host device 400 may provide the command and the physical address corresponding thereto to the storage device 50, and at S613, the storage device 50 may perform an operation based on the received physical address.

Figure 7:
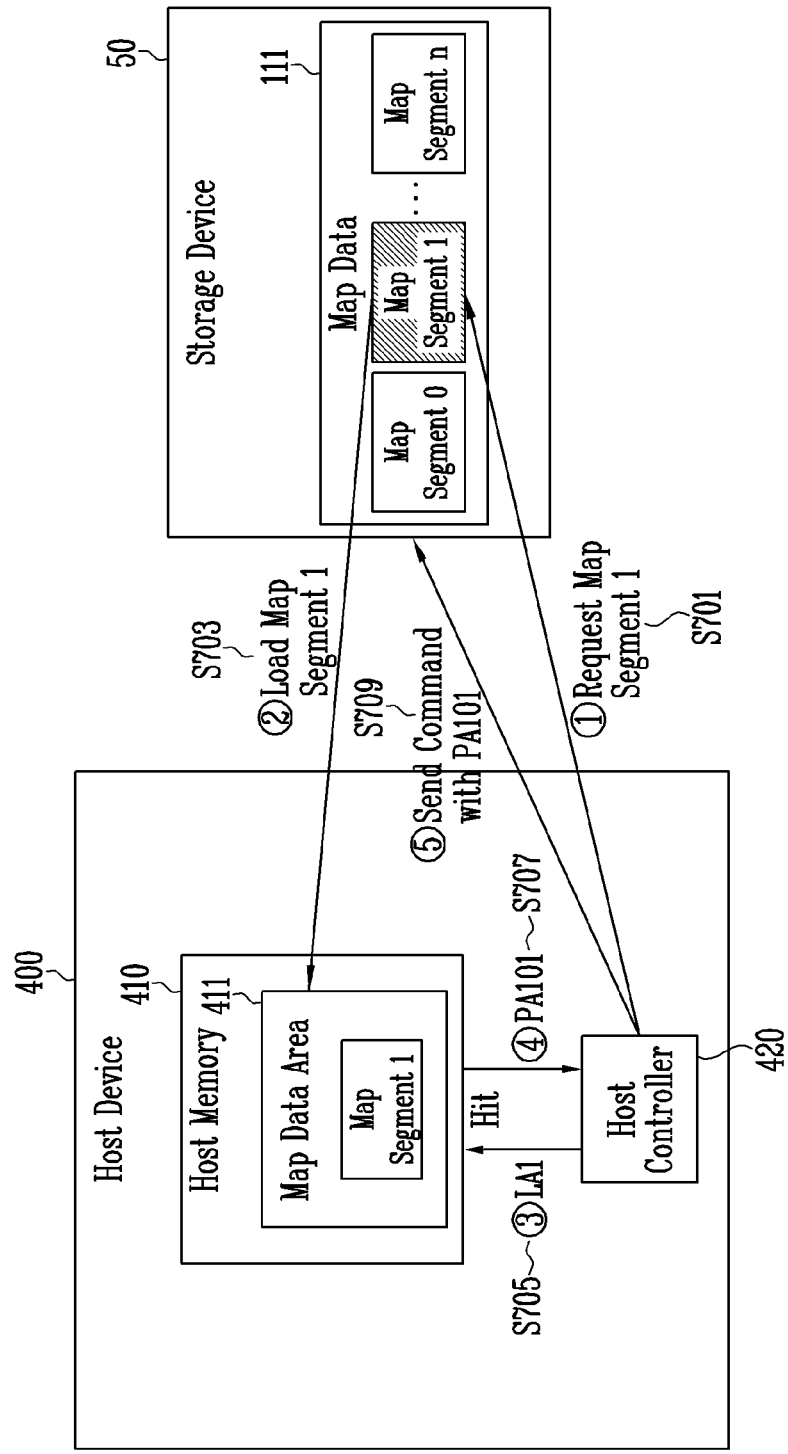
FIG. 7 is a diagram illustrating an example operation of an electronic device based on some embodiments of the disclosed technology.

FIG. 7 is a diagram illustrating an example of a process in which the electronic device performs an operation based on some embodiments of the disclosed technology. FIG. 7 illustrates an example for explaining the process of FIG. 6 in detail.

Referring to FIGS. 6 and 7, at S701, the host controller 420 may request map segment 1, among a plurality of map segments included in map data 111 stored in the storage device 50. This step may correspond to step S601 of FIG. 6.

Accordingly, at S703, map segment 1 stored in the storage device 50 may be loaded into the map data area 411 in the host memory 410. This step may correspond to step S605 of FIG. 6.

Thereafter, at S705, the host controller 420 may check mapping information in map segment 1 stored in the map data area 411 for logical address LA1 corresponding to the command to be provided to the storage device 50. When mapping information corresponding to LA1 is included in map segment 1, the host controller 420 may obtain physical address PA101 corresponding to logical address LA1 from the map data area 411 at S707. Steps S705 and S707 may correspond to step S609 of FIG. 6.

At S709, the host controller 420 may provide the obtained physical address PA101, together with the command, to the storage device 50, and this step may correspond to step S611 of FIG. 6.

Figure 8:
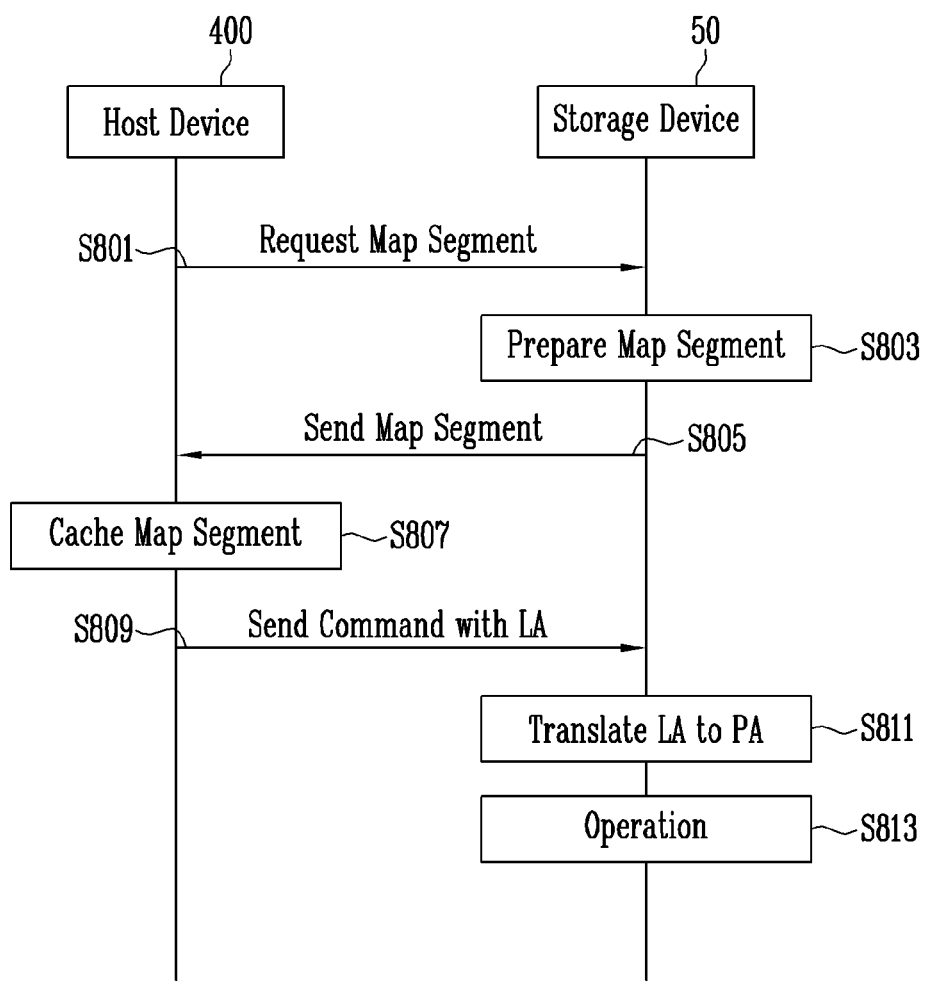
FIG. 8 is a flowchart illustrating an example operation of an electronic device based on some embodiments of the disclosed technology.

FIG. 8 is a flowchart illustrating an example of a process in which the electronic device performs an operation based on some embodiments of the disclosed technology.

Referring to FIG. 8, at S801, a host device 400 may request a map segment from a storage device 50. The host device 400 may designate and request a specific map segment among a plurality of map segments stored in the storage device 50. Accordingly, the storage device 50 may prepare the map segment requested by the host device 400 at S803, and may provide the map segment requested by the host device 400 to the host device 400 at S805.

At S807, the host device 400 may cache the received map segment.

When mapping information related to a logical address corresponding to a command to be provided by the host device 400 to the storage device 50 is not included in the cached map segment, the host device 400 may provide the command and the logical address corresponding thereto to the storage device 50 at S809.

Accordingly, the storage device 50 may translate the received logical address into a physical address at S811, and may perform an operation based on the translated physical address at S813.

Figure 9:
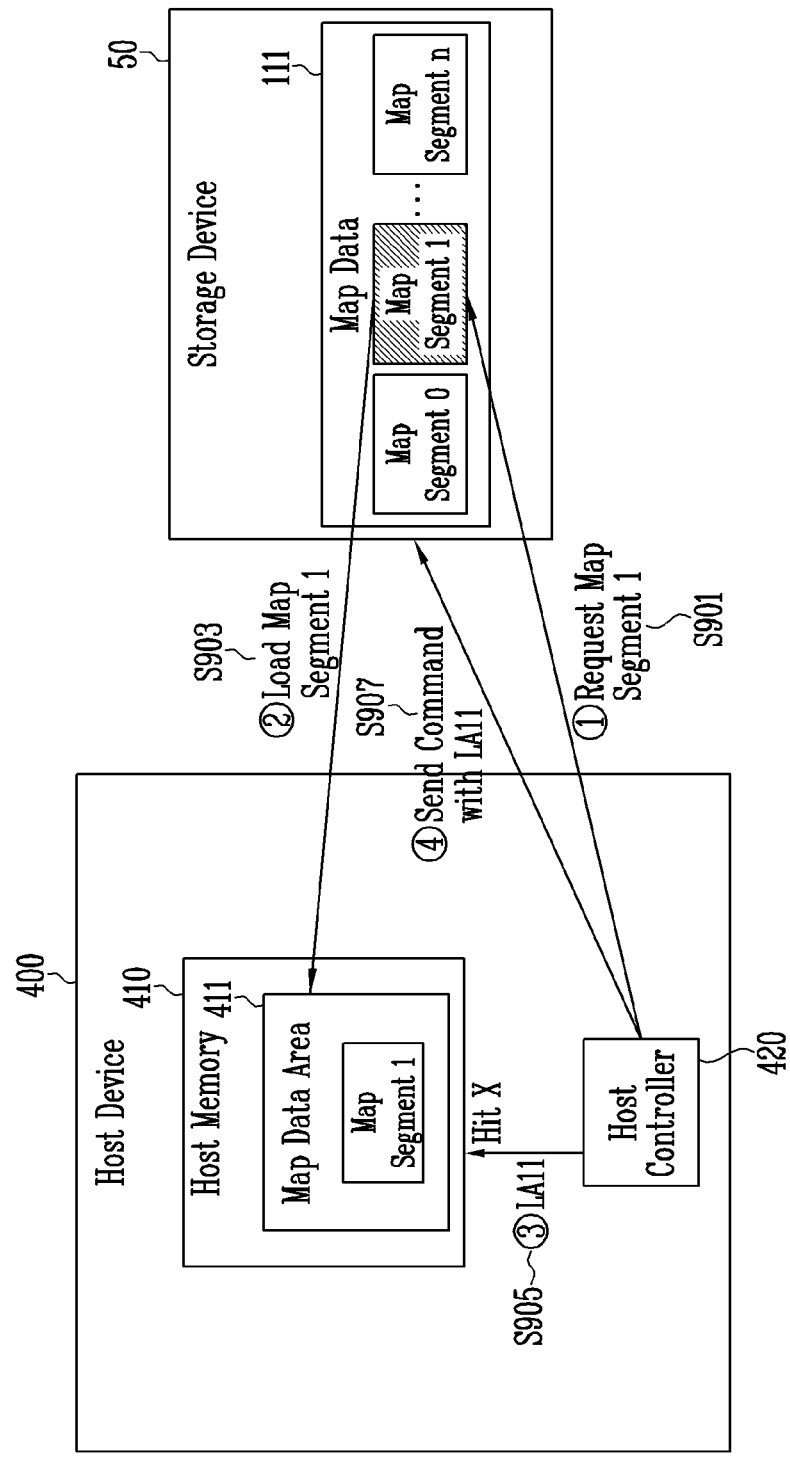
FIG. 9 is a diagram illustrating an example operation of an electronic device based on some embodiments of the disclosed technology.

FIG. 9 is a diagram illustrating an example of a process in which the electronic device performs an operation based on some embodiments of the disclosed technology. FIG. 9 illustrates an example for explaining the process of FIG. 8 in detail.

Referring to FIGS. 8 and 9, at S901, the host controller 420 may request map segment 1, among a plurality of map segments included in map data 111 stored in the storage device 50. The operation performed at S901 may correspond to the operation performed at S801 of FIG. 8.

Accordingly, at S903, map segment 1 stored in the storage device 50 may be loaded into the map data area 411 in the host memory 410. This step may correspond to step S805 of FIG. 8.

Thereafter, at S905, the host controller 420 may check mapping information in map segment 1 stored in the map data area 411 for logical address LA11 corresponding to the command to be provided to the storage device 50. When mapping information corresponding to LA11 is not included in map segment 1, the host controller 420 may provide the obtained logical address LA11, together with the command, to the storage device 50 at S907, and this step may correspond to step S809 of FIG. 8.

Thereafter, the storage device 50 may translate the received logical address LA11 into a physical address, and may perform an operation based on the physical address, as in the case of steps S811 and S813 of FIG. 8.

Figure 10:
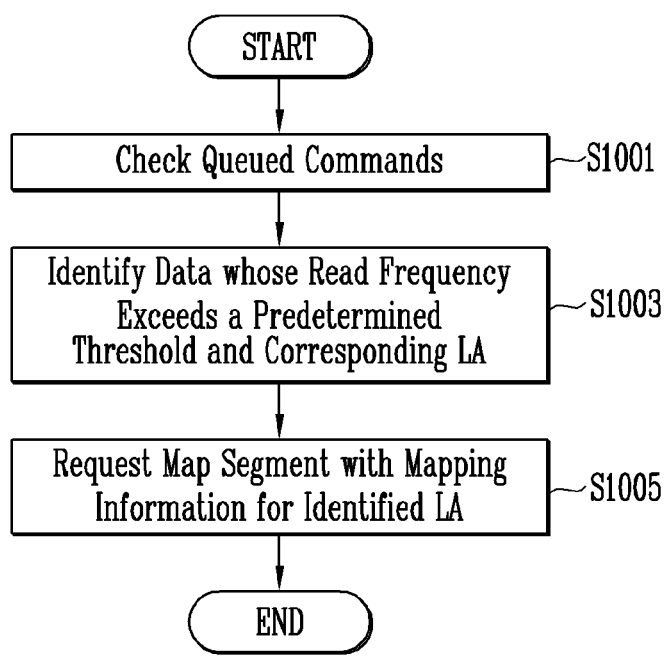
FIG. 10 is a flowchart illustrating an operation of a host device that requests a map segment based on some embodiments of the disclosed technology.

FIG. 10 is a flowchart illustrating a process in which a host device requests a map segment based on some embodiments of the disclosed technology.

Referring to FIGS. 1, 5, and 10, the host controller 420 may check commands that are queued after being generated at S1001. The commands may be queued in the host memory 410, and may be queued in an area, other than the map data area 411, within the host memory 410.

At S1003, as the queued commands are checked, the host controller 420 may identify data, the read frequency of which exceeds a predetermined threshold, and a logical address corresponding to the data. Here, the predetermined threshold for the read frequency may be an absolute reference or a relative reference. For example, data on which more than a preset number of read operations are performed may be identified, or data on which the largest number of read operations are performed, for the queued commands, may be identified.

Accordingly, at S1005, the host controller 420 may request a map segment including mapping information for the identified logical address from the storage device 50.

Figure 11:
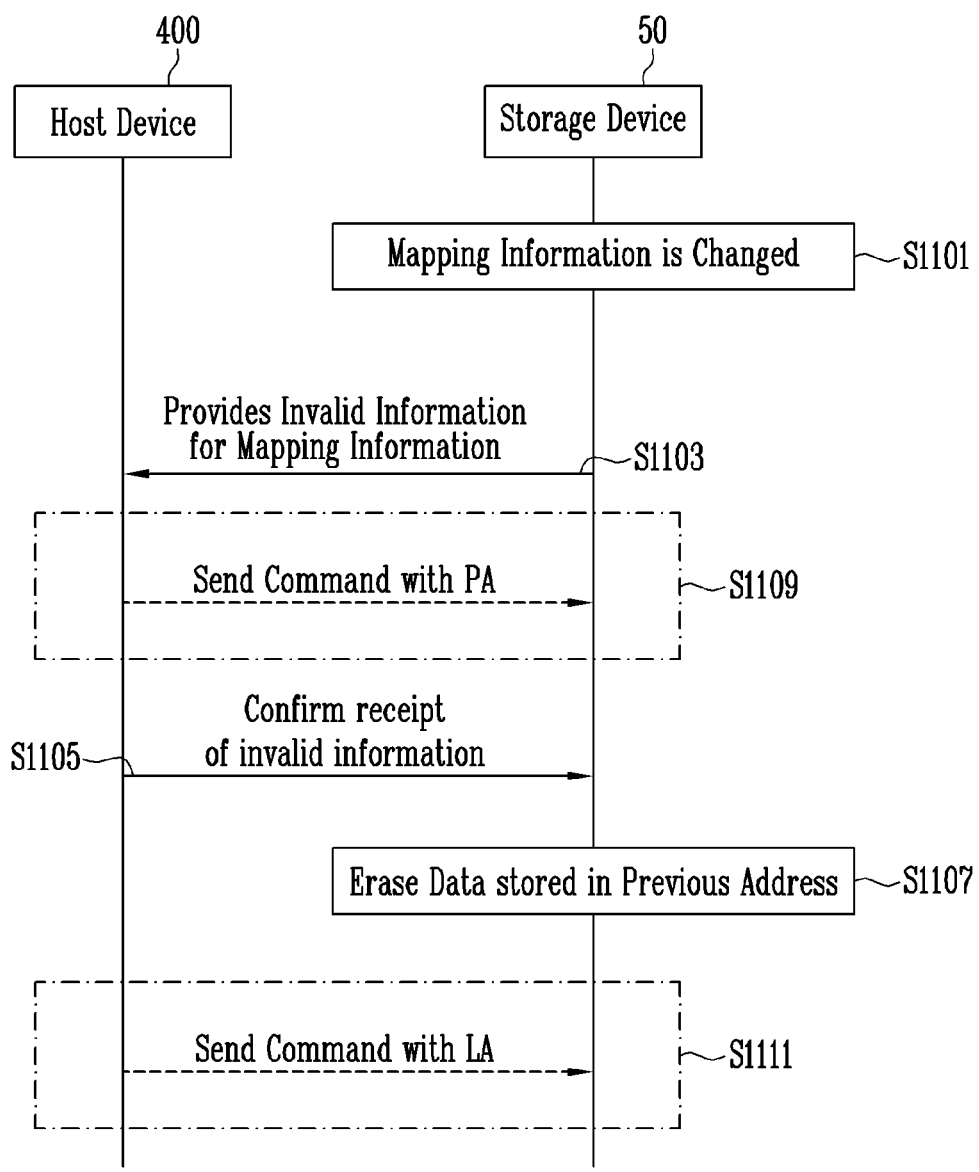
FIG. 11 is a flowchart illustrating an operation of an electronic device that processes changed mapping information based on some embodiments of the disclosed technology.

FIG. 11 is a flowchart illustrating a process in which an electronic device processes changed mapping information based on some embodiments of the disclosed technology.

Referring to FIG. 11, at S1101, part of mapping information in the map data stored in the storage device 50 may be changed or updated. Accordingly, at S1103, the storage device 50 may provide, to the host device 400, an indication that part of mapping information has changed or updated and the previous mapping information is invalid. Here, the indication that the previous mapping information is invalid may be provided together with a command that is provided from the storage device 50 to the host device 400. For example, the indication that the previous mapping information is invalid may be provided from the storage device 50 to the host device 400, together with an asynchronous event request (AER) command.

At S1105, the storage device 50 may confirm that the host device 400 has received the indication that the previous mapping information is invalid. For example, the host device 400 may provide the storage device 50 with a response to the command including the indication that the previous mapping information is invalid, and the storage device 50 may confirm, by receiving the response, that the host device 400 has received the indication that the previous mapping information is invalid. Alternatively, the storage device 50 may queue the command including the indication that the previous mapping information is invalid in a completion queue in the host memory of the host device 400, and the storage device 50 may confirm that the host device 40 has received the indication that the previous mapping information is invalid, by determining whether the host device 400 fetches the command queued in the completion queue.

At S1107, the storage device 50 may erase data stored at an address indicated by the previous mapping information. That is, when the mapping information is changed, the storage device 50 may erase data stored at a previous address after confirming that the host device 400 has received the indication that the previous mapping information is invalid, rather than erasing the data stored at the previous address immediately after storing the data at a changed address. Therefore, even if there are some discrepancies between the map data in the storage device 50 and the map data in the host device 400 during a process in which the storage device 50 transmits, to the host device 400, the indication that previous mapping information is invalid, the storage device 50 may normally perform an operation corresponding to the command of the host device 400.

That is, the host device 400 may provide a command to the storage device 50 before receiving the indication that previous mapping information is invalid at S1109, or may provide the command to the storage device 50 after receiving the indication that previous mapping information is invalid at S1111. At S1109 where the host device 400 provides the command to the storage device 50 before receiving the indication that previous mapping information is invalid, the host device 400 may provide a physical address corresponding to the command, together with the command, to the storage device 50. At S1111 where the host device 400 provides the command to the storage device 50 after receiving the indication that previous mapping information is invalid, the host device 400 may provide a logical address corresponding to the command, together with the command, to the storage device 50. Operations that are performed at S1109 and S1111 will be described in detail below with reference to FIGS. 12 and 13.

Figure 12:
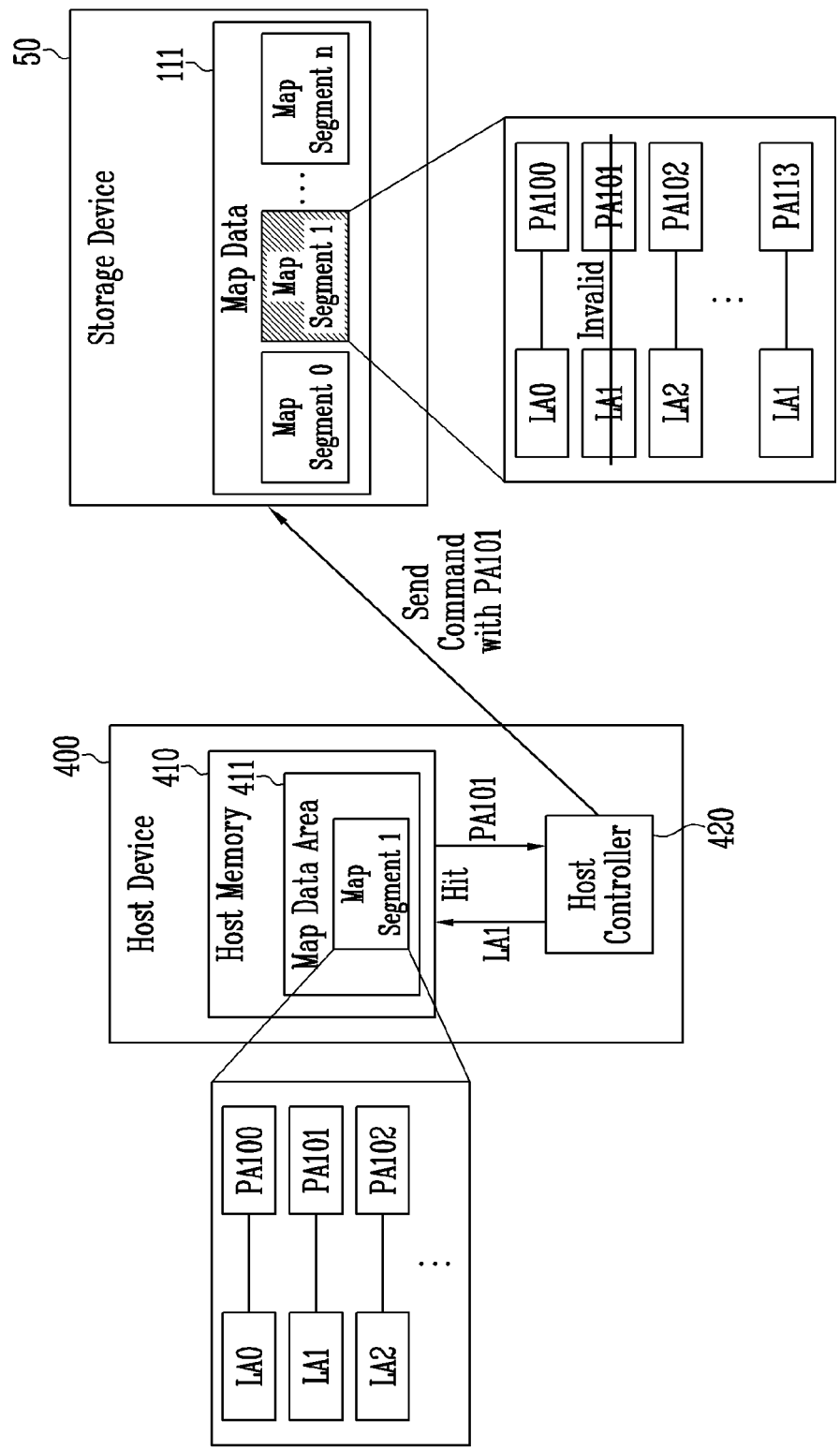
FIG. 12 is a flowchart illustrating an example operation of an electronic device that is performed based on changed mapping information based on some embodiments of the disclosed technology.

FIG. 12 is a flowchart illustrating an example of a process in which an electronic device performs an operation based on changed mapping information based on some embodiments of the disclosed technology.

Referring to FIGS. 1, 11, and 12, certain operations are performed at S1109 of FIG. 11 as illustrated in FIG. 12. Mapping information for logical address LA1 of map segment 1, among map segments included in map data in the storage device 50, is changed or updated. Accordingly, previous mapping information (LA1-PA101) for LA1 is invalidated, and new mapping information (LA1-PA113) is stored.

Therefore, at S1103 of FIG. 11, the storage device 50 may transmit, to the host device 400, an indication that the previous mapping information for LA1 is invalid, but what is illustrated in FIG. 12 may be a state before the host device 400 receives the corresponding information. Accordingly, the mapping information for LA1 may be maintained in LA1-PA101 as it is, and thus the mapping information for LA1 may be identical to the previous information in a map segment 1 stored in the map data area 411 of the host memory 410. That is, in the case of FIG. 12, there are discrepancies between the map data 111 in the storage device 50 and the map data in the host device 400.

Because the host device 400 does not yet know that the mapping information for LA1 has changed or updated, the host controller 420 acquires a physical address PA101 into which a logical address LA1 corresponding to the command to be provided to the storage device 50 is translated or mapped, based on the mapping information of the map segment 1 stored in the map data area 411, and may provide the physical address PA101 corresponding to the command, together with the command, to the storage device 50.

However, as described above with reference to FIG. 11, the storage device 50 may maintain data stored at the previous address until it confirms that the host device 400 has received the indication that the previous mapping information is invalid. That is, although the storage device 50 stores data from the previous physical address PA101 to the changed physical address PA113 as the mapping information for logical address LA1 is changed, the storage device 50 may maintain the data stored at the previous physical address PA101 without erasing the data stored at the previous physical address PA101.

The storage device 50 may perform an operation corresponding to PA101, for example, a read operation, in response to the command received from the host device 400, and the previous data remains at PA101 without being erased. Thus, in spite of the mismatch between the map data 111 in the storage device 50 and the map data in the host device 400, the storage device 50 may successfully obtain desired data.

Figure 13:
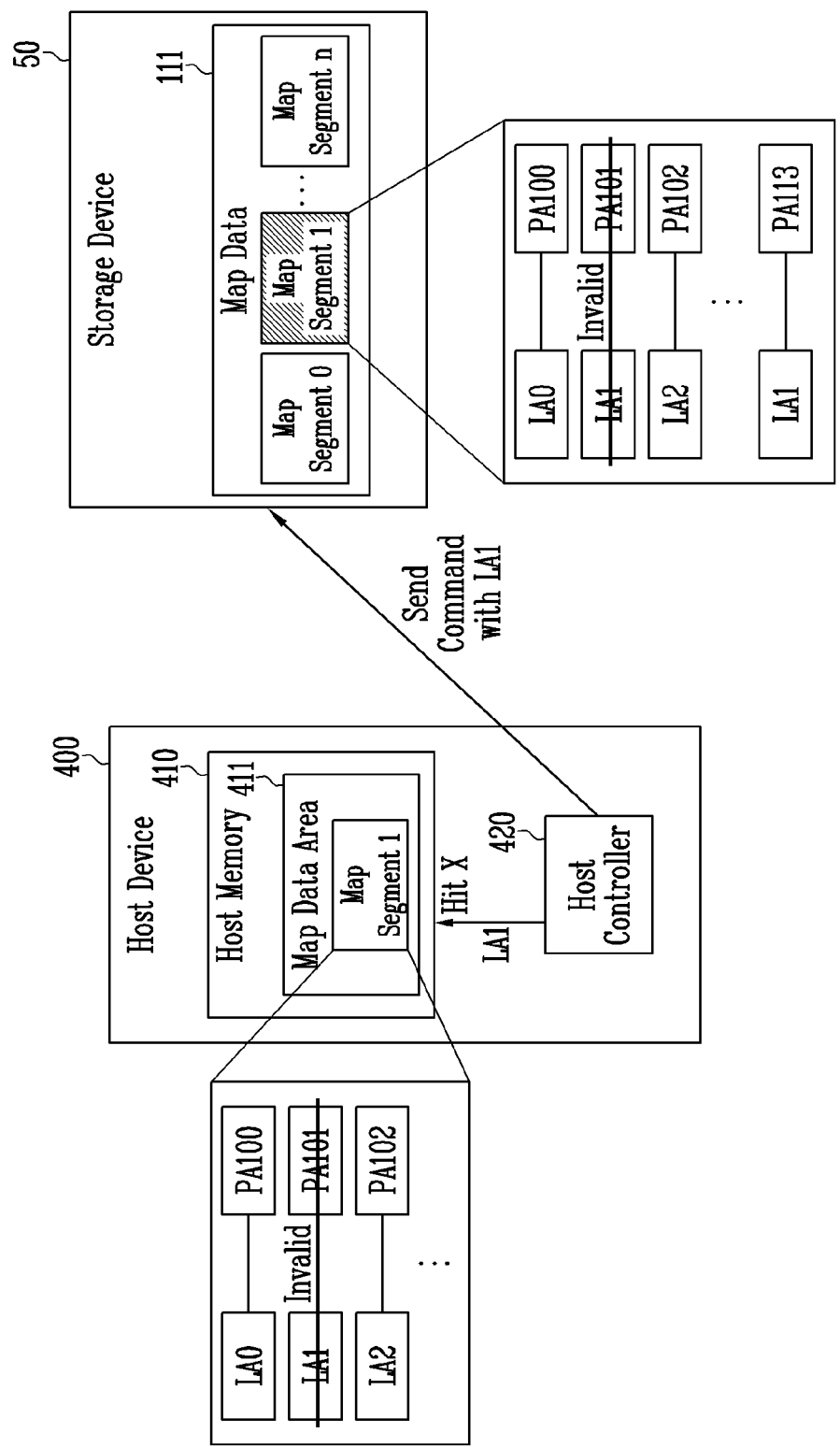
FIG. 13 is a flowchart illustrating an example operation of an electronic device that is performed based on changed mapping information based on some embodiments of the disclosed technology.

FIG. 13 is a flowchart illustrating an example of a process in which the electronic device performs an operation based on changed mapping information based on some embodiments of the disclosed technology.

Referring to FIGS. 1, 11, and 13, an example for explaining step S1111 of FIG. 11 in detail is illustrated in FIG. 13. Mapping information for logical address LA1 of map segment 1, among map segments included in map data in the storage device 50, is changed. Accordingly, previous mapping information (LA1-PA101) for LA1 is invalidated, and new mapping information (LA1-PA113) is stored.

Therefore, at S1103 of FIG. 11, the storage device 50 may transmit an indication that previous mapping information for LA1 is invalid to the host device 400, after which the storage device 50 may confirm that the host device 400 has received the indication that previous mapping information is invalid. Because the host device 400 has received the indication that previous mapping information for LA1 is invalid, mapping information (LA1-PA101) for LA1 in the map segment 1 stored in the map data area 411 of the host memory 410 may be invalidated.

Accordingly, even if the host controller 420 checks the mapping information of map segment 1, which is stored in the map data area 411, for logical address LA1 corresponding to the command to be provided to the storage device 50, there is no valid mapping information corresponding to LA1, and thus the host controller 420 provides only a logical address LA1 corresponding to the command, together with the command, to the storage device 50.

However, as described above with reference to FIG. 11, the storage device 50 may confirm that the host device 400 has received the indication that previous mapping information is invalid, and may then erase the data stored at the previous address. That is, the storage device 50 may store the data from the previous physical address PA101 to the changed physical address PA113 with the change of mapping information for logical address LA1. After confirming that the host device 400 has received the indication that the previous mapping information is invalid at S1105 of FIG. 11, the storage device 50 may erase data stored at the previous physical address PA101 at S1107.

The storage device 50 may translate a logical address LA1 received from the host device 400 into a physical address PA113 based on the changed mapping information of the map data 111 in the storage device 50. Thereafter, the storage device 50 may perform an operation based on physical address PA113.

Figure 14:
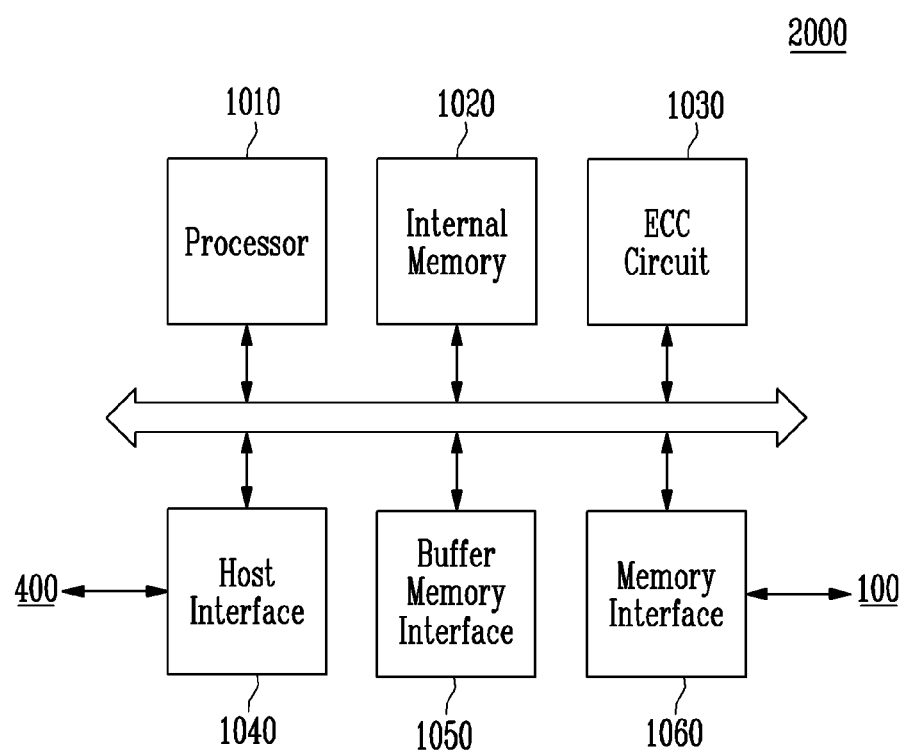
FIG. 14 is a diagram illustrating an example of a memory controller of FIG. 1 based on some embodiments of the disclosed technology.

FIG. 14 is a diagram illustrating an embodiment 2000 of the memory controller 200 within the storage device 50 in the electronic device 1000 of FIG. 1.

Referring to FIG. 14, a memory controller 2000 may include a processor 1010, an internal memory 1020, an error correction circuit 1030, a host interface 1040, a buffer memory interface 1050, and a memory interface 1060.

The processor 1010 may perform various operations for controlling a memory device 100 within the storage device 50, or may generate various commands. When a request is received by the memory controller 2000 from a host device 400 shown in FIG. 1, the processor 1010 may generate a command in response to the received request, and may transmit the generated command to a queue controller (not illustrated) within the memory controller 2000.

The internal memory 1020 of the memory controller 2000 may store various types of information required for the operation of the memory controller 2000. For example, the internal memory 1020 may include logical-to-physical address map tables. The internal memory 1020 may be configured by using or including one or more of a random access memory (RAM), a dynamic RAM (DRAM), a static RAM (SRAM), a cache, and a tightly coupled memory (TCM).

The error correction circuit 1030 of the memory controller 2000 may detect and correct errors in data received from the memory device 100 within the storage device 50 by using an error correction code (ECC). The processor 1010 may adjust a read voltage based on the result of error detection by the error correction circuit 1030, and may control the memory device 100 to perform re-reading. In an example embodiment, the error correction circuit may be provided as an element of the memory controller 2000.

The host interface 1040 of the memory controller 2000 may exchange a command, an address, data, etc. between the memory controller 2000 and the host device 400. For example, the host interface 1040 may receive a request, an address, data, etc. from the host device 400, and may output data that is read from the memory device 100 to the host device 400. The host interface 1040 may communicate with the host device 400 using various protocols. The host interface 1040 may store map data to the host device 400 in response to a command from the processor 1010, and may provide an indication that map data has changed to the host device 400.

The buffer memory interface 1050 of the memory controller 2000 may transfer data between the processor 1010 and a buffer memory within the memory controller 2000 (e.g., the buffer memory 210 shown in FIG. 3). The buffer memory may be used as a working memory or a cache memory of the memory controller 2000, and may store data that is used in the storage device 50. The buffer memory interface 1050 may be used as a read buffer, a write buffer, a map buffer, or others by the processor 1010.

In an embodiment, the buffer memory may include a double data rate synchronous dynamic random access memory (DDR SDRAM), a DDR4 SDRAM, a low power double data rate4 (LPDDR4) SDRAM, a graphics double data rate (GDDR) SDRAM, a low power DDR (LPDDR) SDRAM, or a Rambus DRAM (RDRAM).

The memory interface 1060 of the memory controller 2000 may exchange a command, an address, data, etc. between the memory controller 2000 and the memory device 100. For example, the memory interface 1060 may transmit the command, address, data, etc. to the memory device 100 through a channel, and may receive data, etc. from the memory device 100. The memory interface 1060 may receive map data from the memory device 100 in response to a command from the processor 1010.

While this patent document contains many specifics, these should not be construed as limitations on the scope of any disclosed technology or of what may be claimed, but rather as descriptions of features that may be specific to particular embodiments of particular disclosed technology. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

The embodiments and implementations disclosed above are examples only; various enhancements and variations to the disclosed embodiments and implementations and other embodiments and implementations can be made based on what is described and illustrated in this patent document.

What is claimed is:

1. An electronic device, comprising:
a storage device including a memory device configured to store data which includes map data including a plurality of map segments and a memory controller configured to be in communication with the memory device and operable to control the memory device; and
a host device configured to be in communication with the storage device and structured to include a host memory and configured to transmit, to the storage device, a request for one or more of the plurality of map segments from the storage device, wherein the memory controller of the storage device is configured to provide the one or more map segments to the host memory in the host device in response to the request from the host device,
wherein the host device is configured to transmit, to the storage device, a command requesting access to the memory device based on the one or more map segments,
wherein, upon a change in at least part of mapping information, included in the one or more map segments provided to the host memory, the memory controller provides the host device with an indication that the mapping information in the host memory corresponding to the changed mapping information is invalid, and
wherein the memory controller controls the memory device to maintain data stored at a location corresponding to the changed mapping information until the host device confirms the indication.

2. The electronic device according to claim 1, wherein each of the map segments includes the mapping information between a logical address and a physical address.

3. The electronic device according to claim 2, wherein the command includes a physical address to be accessed in the memory device.

4. The electronic device according to claim 3, wherein the memory controller accesses the memory device based on the physical address.

5. The electronic device according to claim 1, wherein the host device requests the storage device to access the memory device based on the indication that the mapping information in the host memory corresponding to the changed mapping information is invalid.

6. The electronic device according to claim 5, wherein, upon a determination that mapping information corresponding to an address in the memory device to be accessed by the host device is invalid, the host device provides a logical address in the memory device to be accessed to the storage device.

7. The electronic device according to claim 6, wherein the memory controller loads one or more of the plurality of map segments from the memory device in response to the command.

8. The electronic device according to claim 7, wherein the memory controller translates the logical address received from the host device into a physical address corresponding to the logical address, and accesses the memory device based on the physical address.

9. The electronic device according to claim 1, wherein, upon receipt of the indication that the mapping information in the host memory corresponding to the changed mapping information is invalid, the memory controller erases data stored at a previous address of the changed mapping information.

10. A storage device, comprising:
a memory device configured to store data which includes map data including a plurality of map segments; and
a memory controller configured to be in communication with the memory device and, upon receipt of a request from a host device, provide, to the host device, one or more of the plurality of map segments designated by the host device,
wherein upon a change in at least part of mapping information, included in the one or more map segments provided to the host device, the memory controller provides the host device with an indication that mapping information in the host device corresponding to the changed mapping information is invalid, and
wherein the memory controller controls the memory device to maintain data stored at a location corresponding to the changed mapping information until the host device confirms the indication.

11. The storage device according to claim 10, wherein the memory controller receives, from the host device, a command requesting access to the memory device and a physical address in the memory device to be accessed.

12. The storage device according to claim 11, wherein in response to the command, the memory controller accesses the memory device based on the physical address.

13. A host device, comprising:
a host controller configured to transmit, to a storage device outside the host device, a request for one or more of a plurality of map segments stored in a memory device of the storage device; and a host memory configured to be in communication with the host controller and to cache the one or more map segments received from the storage device, wherein the host controller receives, from the storage device, an indication that a portion of one or more map segments cached in the host memory is invalid, and wherein the storage device maintain data stored at a location corresponding to the portion of one or more map segments cached in the host memory until the host controller transmit a confirmation regarding the indication.

14. The host device according to claim 13, wherein the host controller transmits, to the storage device, a request for a map segment that includes mapping information for an address corresponding to data that is expected to be read at least at a preset frequency.

15. The host device according to claim 13, wherein the host memory includes a map data area in which the map segments are cached.

16. The host device according to claim 15, wherein the map data area is an area in which data is stored by the storage device.

17. The host device according to claim 15, wherein the host controller is configured to perform only a read operation on the map data area.

18. The host device according to claim 13, wherein the host controller provides address information of the memory device to be accessed to the storage device based on the cached map segments.

* * * * *